S. W. DAVIS.
ENDLESS-CHAINS FOR HORSE-POWERS.
No. 169,780. Patented Nov. 9, 1875.
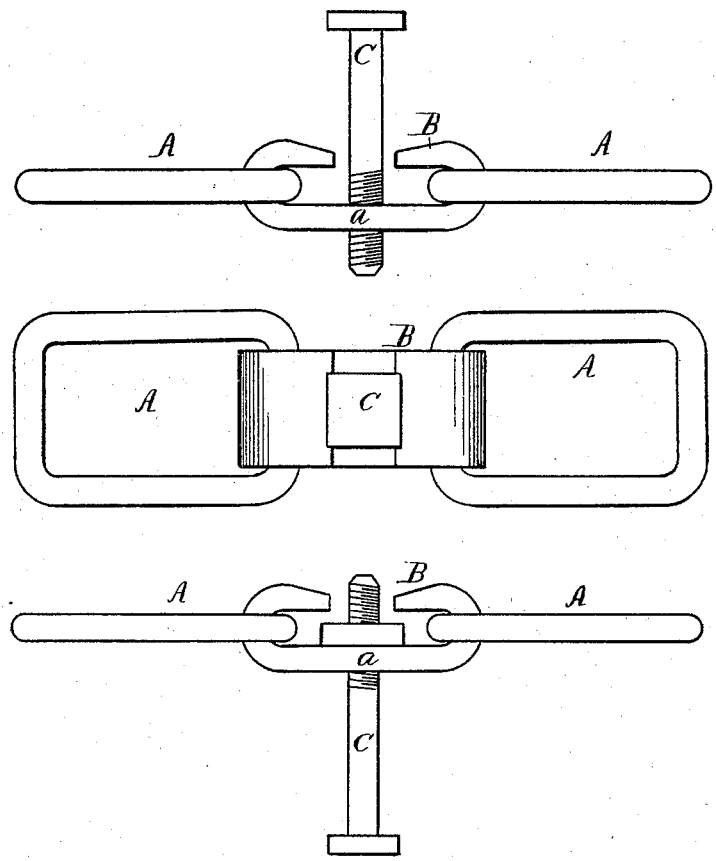
WITNESSES:
Jas. F. Duhamel.
Thomas Byrne,
INVENTOR:
Sam'l W. Davis.
Per H. S. Abbot
Attorney.

UNITED STATES PATENT OFFICE.

SAMUEL W. DAVIS, OF BRASHER, NEW YORK.

IMPROVEMENT IN ENDLESS CHAINS FOR HORSE-POWERS.

Specification forming part of Letters Patent No. 169,780, dated November 9, 1875; application filed May 19, 1875.

*To all whom it may concern:*

Be it known that I, SAMUEL W. DAVIS, of Brasher, county of St. Lawrence and State of New York, have invented certain new and useful Improvements in Endless Chains for Horse-Powers, of which the following is a specification:

My invention relates to that class of endless chains used in the so-called "tread-mill" horse-powers, and for other purposes, composed of alternate links and double hooks; and the nature of my invention consists in forming a nut in the center of the double hook, and passing a bolt through the slat into said nut, for the purpose of fastening the slat and preventing the links from becoming unhooked, as will be hereinafter more fully set forth.

In order to enable others skilled in the art to which my invention appertains to make and use the same, I will now proceed to describe its construction and operation, referring to the annexed drawing, which forms a part of this specification, and which represents a perspective view of my invention.

A A represent two of the links of an endless chain, connected by means of a double hook-bar, B. In the center of this bar is made a hole with female screw-threads, forming a nut, $a$. C is a bolt, which is to be passed from the outside through the slat of the tread of the horse-power, and be screwed into the nut $a$, formed in the center of the hook-bar B. The bolt C thus fastens the slat, and at the same time prevents the links from becoming unhooked in case of slackening of the chain. In chains of this description heretofore the links have been held from uncoupling by means of a large bolt-head, the bolt simply passing through the hook-bar, and then through the slat, and fastened by a nut on the outside thereof. The horse will then often tread on the nuts and projecting bolt ends, which is not only liable to injure the horse, but will also spoil the threads, so as to make it difficult to remove a slat and replace another. With my invention the horse treads on the bolt-heads, which do not injure him, and the hooks of the hook-bar are brought so close together that the projecting end of the bolt will fill the space between the hooks and prevent the links from uncoupling.

Having thus fully described my invention, what I claim as new, and desire to secure by Letters Patent, is—

In an endless chain composed of alternate links A and double hook-bars B, the nut $a$, formed in the center of the hook-bar, and the bolt C, screwed through said nut, and projecting far enough between the hooks to lock the links, substantially as herein set forth.

In testimony that I claim the foregoing as my invention I hereunto affix my signature this 1st day of May, 1875.

SAMUEL W. DAVIS.

Witnesses:
 CHARLES A. KELLOGG,
 L. P. GORDON.